United States Patent [19]

Rudolph, Jr.

[11] 4,320,328
[45] Mar. 16, 1982

[54] APPARATUS FOR FULL VOLTAGE START OF VIBRATORY EXCITORS

[75] Inventor: Kenneth E. Rudolph, Jr., Louisville, Ky.

[73] Assignee: Vibranetics, Inc., Louisville, Ky.

[21] Appl. No.: 63,498

[22] Filed: Aug. 3, 1979

Related U.S. Application Data

[63] Continuation-in-part of Ser. No. 19,215, Mar. 9, 1979.

[51] Int. Cl.³ .............................................. H02P 1/26
[52] U.S. Cl. .................................... 318/431; 318/780
[58] Field of Search ............... 318/780, 813, 778, 779, 318/431, 705

[56] References Cited

U.S. PATENT DOCUMENTS 1,921,770  8/1933  Nelson et al. ..................... 318/780
2,583,299  1/1952  Lloyd et al. ...................... 318/780

Primary Examiner—David Smith, Jr.
Attorney, Agent, or Firm—Pollock, Vande Sande & Priddy

[57] ABSTRACT

An improved apparatus for an automatic full voltage start of a polyphase synchronous or induction motor. A full line voltage is employed to start the motor by energizing two tap relays to shunt the tap connections of the coils of an autotransformer and to thereby apply a line voltage to the primary windings of the motor. A strap relay is de-energized to disconnect the coils of the autotransformer when the motor is at rest and when the motor is being started. After the motor is started, the tap relays are de-energized to break the shunt connections and the strap relay is energized to connect the coils of the autotransformer. The taps of the autotransformer apply a preset reduced voltage to operate the motor.

13 Claims, 4 Drawing Figures

APPARATUS FOR FULL VOLTAGE START OF VIBRATORY EXCITORS

CROSS-REFERENCE TO RELATED APPLICATION

This application is a continuation-in-part of prior copending application, Ser. No. 19,215, filed Mar. 9, 1979.

BACKGROUND OF THE INVENTION

The invention relates to an improved apparatus for applying a full line voltage to start an electric motor, and, more particularly, to such a motor start apparatus including solid state switches for shunting the taps of an autotransformer to apply the line voltage to start the motor and additional solid state switches for protecting against a short circuit of the line voltage source when the taps of the autotransformer are positioned at low tap settings.

Polyphase synchronous or induction motors have been used to operate vibratory excitors and, for such applications, an autotransformer may be used to generate a reduced operational voltage for the motor.

the autotransformer comprises a plurality of coils that are connected in series and positioned across a relatively high line voltage source. Each coil of the autotransformer has an associated tap or wiper that is moved along the coil to vary the voltage that appears on the tap. The taps are connected to associated primary windings of the motor and the motor is operated at a speed corresponding to the voltages on the various taps of the autotransformer.

Typically, the motors of vibratory excitors are operated at a reduced voltage with respect to the line voltage and therefore, the taps of the coils of an associated autotransformer are adjusted to produce the lower operational voltage. However, although such motors are well adapted to operate at reduced voltages, the motors typically require a relatively high voltage to break from a rest position. Thus, if the autotransformer of a motor is adjusted to a reduced voltage and the motor is operated at the reduced voltage, when the motor is stopped, it is necessary to readjust the autotransformer of the motor to apply a relatively higher voltage to restart the motor. If many motors are used, for example, in a factory environment, such a voltage adjustment by the operator for many machines is time consuming and, therefore, expensive. Thus, it would be advantageous to provide a means to automatically apply an increased voltage to start such motors and to thereafter automatically reduce the operational voltage of the motors to a lower preset operational voltage value.

An automatic full voltage motor start system is disclosed in the patent to C. C. Nelson et al, U.S. Pat. No. 1,921,770. However, the circuit disclosed in the patent includes a multipole relay that is employed to shunt around the autotransformer of a motor to apply a full line voltage to start the motor. After the motor is started, the shunting relay is opened and another multipole switch is used to apply the line voltage to the coils of the autotransformer to generate a reduced operational voltage that is then gradually increased to the full line operating voltage.

Such a prior art voltage start circuit is complicated due to the fact that the line voltage input to the autotransformer must be switched in order to shunt the line voltage around the autotransformer. Thus, the prior art circuit necessarily employs a relatively complicated multi-pole switching apparatus to provide the increased voltage start function.

Accordingly, it is an object of the invention to provide a simple and effective switching apparatus for automatically applying a full line voltage to start a motor and automatically applying a preset reduced running voltage to operate the motor.

A further object of the invention is to provide such a switching apparatus wherein the autotransformer is not disconnected from the line input voltage when the switching apparatus switches to a full voltage start condition.

Another object of the invention is to provide such a full voltage start apparatus that includes means for avoiding transient current surges in the autotransformer when the full line voltage is applied to start the motor.

A further object of the invention is to provide a full voltage motor start apparatus that avoids a shorting of the line voltage supply when a full voltage is applied and taps of the autotransformer are set at low voltage positions.

These and other objects of this invention will become apparent from a review of the detailed specification which follows and a consideration of the accompanying drawings.

BRIEF SUMMARY OF THE INVENTION

In order to achieve the objects of the invention and to overcome the problems of the prior art, the improved full voltage motor start apparatus, according to the invention, includes an autotransformer that has at least two coils and an associated strap relay that is de-energized to disconnect the coils while the motor is stopped and when the motor is being started. Taps on each of the coils of the autotransformer are connected to associated solid state tap relays and the relays are in turn connected to associated primary windings of the motor.

When a start switch is activated, the tap relays are energized to shunt the taps of the autotransformer to receive the line input voltage and to apply the line input voltage to the primary windings of the motor, to break the motor from a rest position. After the motor is started, a control timing circuit de-energizes the tap relays and, thereafter, energizes the strap relay to cause the taps of the autotransformer to apply a reduced preset operational voltage to the primary windings of the motor.

An alternate embodiment of the invention includes stops for blocking the movement of the taps to low autotransformer tap settings. The mechanical stops are used to perform the circuit protect function of the strap relay.

DETAILED DESCRIPTION OF PREFERRED EMBODIMENT

Figure 1:
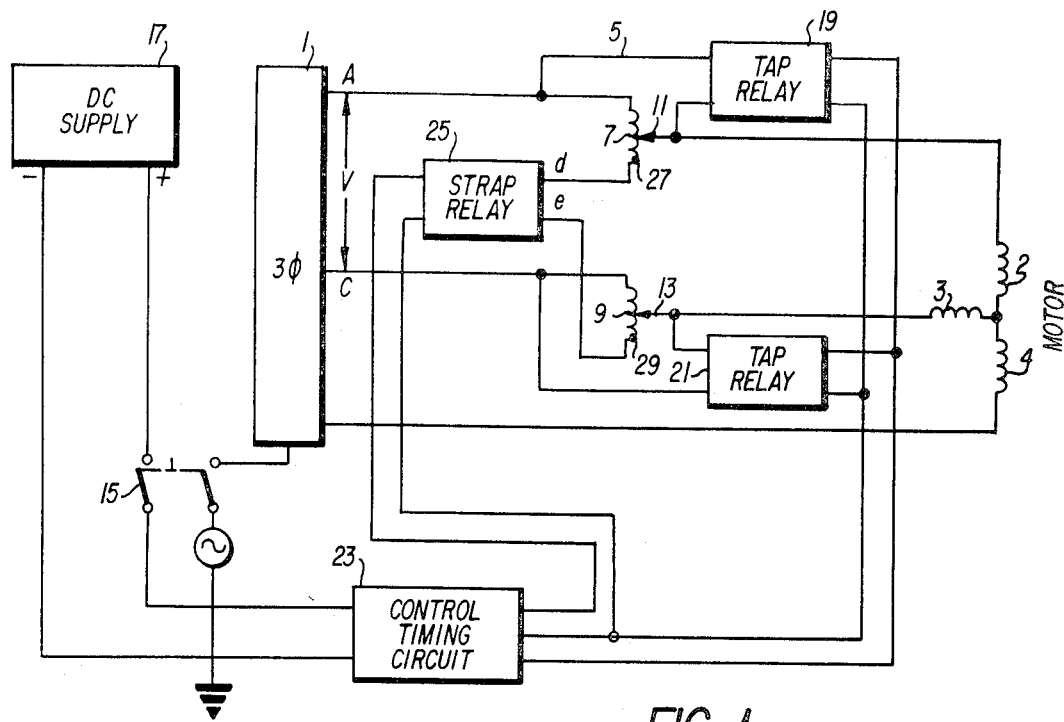
FIG. 1 shows a circuit diagram of a full voltage motor start circuit in accordance with the invention.

The remaining portion of this specification will describe preferred embodiments of the invention when read in conjunction with the attached drawings, in which like reference characters identify identical apparatus.

FIG. 1 shows a circuit diagram of a full voltage motor start embodiment of the invention. As shown in FIG. 1, primary windings 2 and 3 of an electrical motor 6 are connected by corresponding taps 11 and 13 to the coils 7 and 9 of an autotransformer. The coils of the autotransformer are in turn connected to lines A and C of a 3-phase voltage supply 1. The third line of the 3-phase supply is connected directly to a third primary winding 4 of the motor 6. A first tap relay 19 is connected across the tap 11 and the line A and a second tap relay 21 is connected across the tap 13 and the line C. A strap relay 25 is connected between the lines d and e of the coils 7 and 9.

When a start switch 15 is open, the motor 6 is de-energized and at rest and the tap relays 13 and 19 and strap relay 25 are de-energized to provide open circuits across their respective connections. However, when the start switch 15 is closed, line voltage from the 3-phase source 1 is applied to the lines A and C and the third voltage input line of the circuit of FIG. 1. In addition, an energizing DC voltage from a DC supply 17 is applied to a control timing circuit 23 that operates to energize the tap relays 19 and 21 to shunt the associated taps 11 and 13 to the input voltage lines A and C. Thus, a full line voltage is applied to the primary windings 2, 3 and 4 to start the motor.

It is an important feature of the invention to utilize tap relays 19 and 21 that will turn on to provide shunt connections relatively quickly after the start switch 15 is closed. Such a rapid turning on of the tap switches 19 and 21 is necessary in order to ensure that the taps 11 and 13 are shunted to the associated lines A and C before excessive energy has built up in the autotransformer coils 7 and 9 due to the applied line voltae of the lines A and C. Thus, undesirable transient current surges in the coils 7 and 9 are avoided.

A preferred embodiment of the invention utilizes relatively fast switching Teledyne P/N 621-6 solid state relays to perform the switching functions of the indicated tap relays 19 and 21. However, it should be appreciated that other types of switches may be employed to perform the indicated switching function. For example, mechanical switches responsive to a mechanical start switch could be employed. Of course, such mechanical switches would have to operate with a switching speed sufficient to make the shunt connections before excessive energy has built up in the coils 7 and 9.

The control timing circuit 23 energizes the tap relays 19 and 21 and thereby maintains a line input voltage for the motor 6 for a time t that is sufficiently long to allow the motor to break-away from its rest position and begin to approach operational speed. After the time t, the control timing circuit operates to de-energize the tap relays 19 and 21 so that the line voltage at A and C is disconnected from the taps 11 and 13. Thereafter, the control timing circuit operates to energize the strap relay 25 to connect the coils 7 and 9.

When the coils 7 and 9 are connected, the autotransformer operates to apply reduced operational voltages to the primary windings 2 and 3 through the taps 11 and 13. It should be appreciated that once the tap relays 19 and 21 have been de-energized and the strap relay 25 has been energized, the taps 11 and 13 may be moved to contact portions of the autotransformer coils 7 and 9 to apply corresponding adjusted reduced running voltages to the primary windings 2 and 3 of the motor.

The strap relay 25 is de-energized to disconnect the coils 7 and 9 while the tap relays are energized in order to ensure that the lines A and C of the 3-phase supply will not be shorted if the taps 11 and 13 are set at low tap settings, for example at positions 27 and 29. Referring to FIG. 1, it can be seen that if the tap relays 19 and 21 are energized and the taps 11 and 13 are set at positions 27 and 29, the de-energized strap relay 25 breaks a short circuit path that would otherwise be established between the lines A and C, through the conducting tap relays 19 and 21 and the lines d and e.

Figure 2:
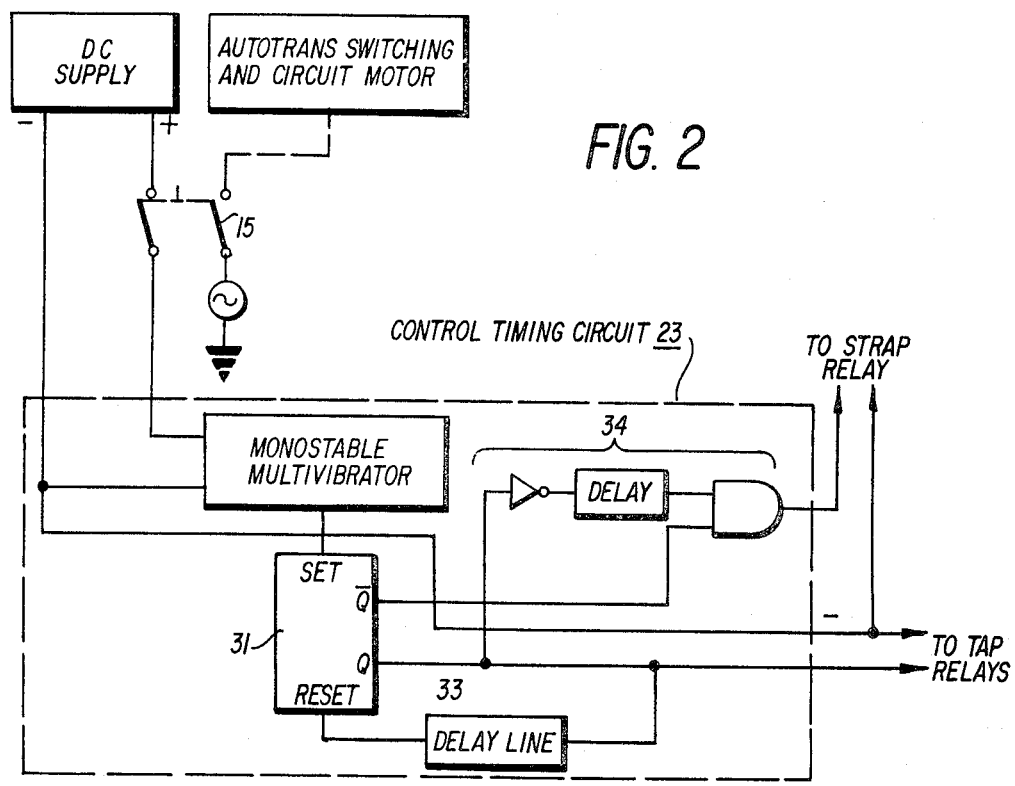
FIG. 2 shows a block diagram of a control timing circuit of FIG. 1.

It will be understood by those skilled in the art that the control timing circuit 23 may be constructed in many ways. FIG. 2 illustrates a block diagram of a preferred embodiment of a control timing circuit that may utilize, for example, integrated circuit logic components to generate activation and deactivation signals to operate the solid state tap relays 19 and 21 and the strap relay 25.

More particularly, the start switch 15 may be operated to turn on the voltage supply 1 and to set a flipflop 31, for example by triggering a monostable multivibrator. The setting of the flipflop 31 causes the output Q of the flipflop to become a high logic level and the high signal is applied to energize the tap relays 19 and 21 and to thereby start the motor. It should be understood that when the flipflop is set, the $\bar{Q}$ output will be forced low to disable the AND gate of the logic 34 and to thereby ensure that the strap relay 25 remains de-energized while the tap relays are energized.

The high signal at Q is also applied to a delay line 33 or other time delay device. After a time t, the delay line 33 applies a reset signal to the flipflop 31 to force Q to go low and $\bar{Q}$ to go high. The low Q signal de-energizes the tap relays 19 and 21 and is inverted, delayed for a time t1 and applied to an input of the AND gate of the logic 34. The high $\bar{Q}$ signal and the inverted, delayed Q signal cause the strap relay 25 to be energized at a time delay t1 after the tap relays have been de-energized. Thus, the strap relay 25 will be energized to connect the coils 7 and 9 after the tap relays have been de-energized to disconnect the line voltage at the lines A and C from the taps 11 and 13.

It will be appreciated by those skilled in the art that the above-described delay line is commercially available or may be readily constructed from commercially available integrated circuits such as monostable multivibrators or integrated circuit counters.

It should also be understood that the function of the control timing circuit 23 may be performed by other means. For example, a manual switch may be employed to energize the tap relays 19 and 21 for as long as a human operator holds the switch in an energizing position. The switch could then be adapted in a manner known to the art to break the energizing connection to the tap relays 19 and 21 before making the energizing connection to the strap relay 25, when the operator releases the momentary start switch.

It should be understood that the strap relay 25 may be a solid state relay that is adapted to connect relay contacts in response to an energization signal, for example a Teledyne P/N 621-6 relay. Of course, other known types of tap relays and strap relays may be used, provided that such relays are operated in the proper sequence in accordance with the invention.

For example, the strap relay 25 may operate as a normally closed relay and the tap relays may operate as normally open relays. Thus, in accordance with the invention, when the start switch 15 is initially closed, a suitable control timing circuit will energize the strap relay 25 to disconnect the autotransformer coils 7 and 9 before energizing the tap relays 19 and 21 to a closed state.

After the motor is started, the control timing circuit will operate to de-energize the tap relays and thereby cause the contacts of the relays to open before de-energizing the strap relay so that the contacts of the strap relay close.

Likewise, if the strap relay 25 is normally open and the tap relays 19 and 21 are normally closed, all of the relays will remain de-energized when the start switch 15 is closed since the de-energized relays will be in their proper initial states. However, after the motor is started, a suitable control timing circuit will operate to energize the tap relays so that the tap relay contacts open and, thereafter, the strap relay will be energized so that the contacts of the strap relay close.

If the strap relay 25 and tap relays 19 and 21 are normally closed relays, a control timing circuit will operate to energize the strap relay and to thereby open its relay contacts when the start switch is closed and the tap relays will remain de-energized so that their contacts remain closed. After the motor has started, the control timing circuit will operate to energize the tap relays so that the contacts of the tap relays open and thereafter, the strap relay will be de-energized so that the contacts of the strap relay close.

Figure 3:
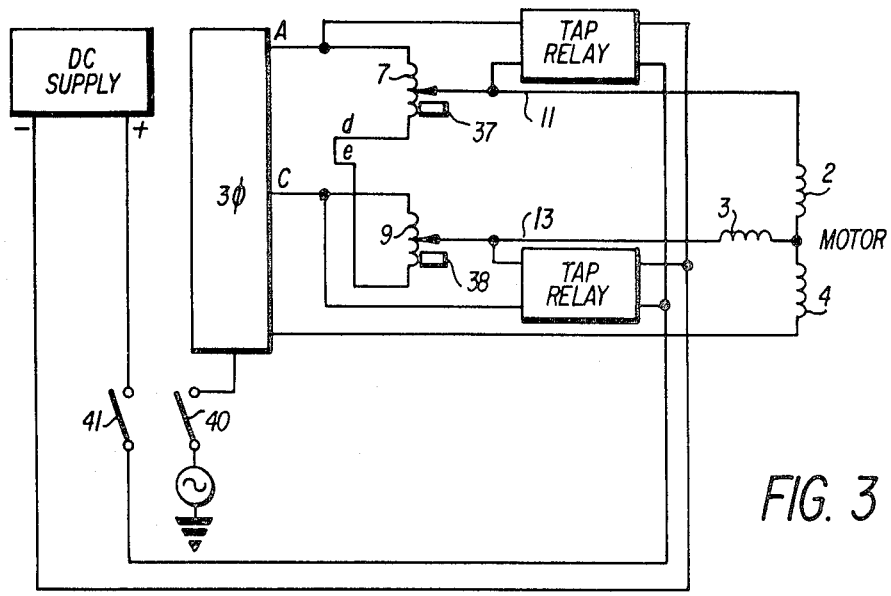
FIG. 3 shows a circuit diagram of an alternate embodiment of the invention employing tap stops.

FIG. 3 illustrates a circuit diagram of an alternate embodiment of the invention wherein stops 37 and 38 are employed to ensure that the taps 11 and 13 are never moved to excessively low autotransformer settings. If such stops are used, a strap relay is not required for circuit protection since even if the taps 11 and 13 are set at the lowest position allowed by the stops and the tap relays are energized, portions of the coils 7 and 9 will remain in circuit to prevent a shorting of the source lines A and C.

In operation, the power switch 40 and relay energization switch 41 are closed to apply line voltage to the autotransformer and to energize the tap relays 19 and 21. After the motor is started, the relay energization switch 41 is opened, the tap relays 19 and 21 are de-energized and, as explained above, a reduced voltage is applied to the primary windings 1 and 2 from the taps 11 and 13 of the autotransformer 5.

A control timing circuit may be employed with the circuit of FIG. 3 to automatically de-energize the tap relays at a time t after a single motor start switch has been activated.

If the tap relays of FIG. 3 are normally closed, the motor is started by closing the power switch 40 with the relay energization switch 41 open. After the motor is started, the relay energization switch 41 is closed to energize the tap relays and to thereby open the tap relay contacts.

Figure 4:
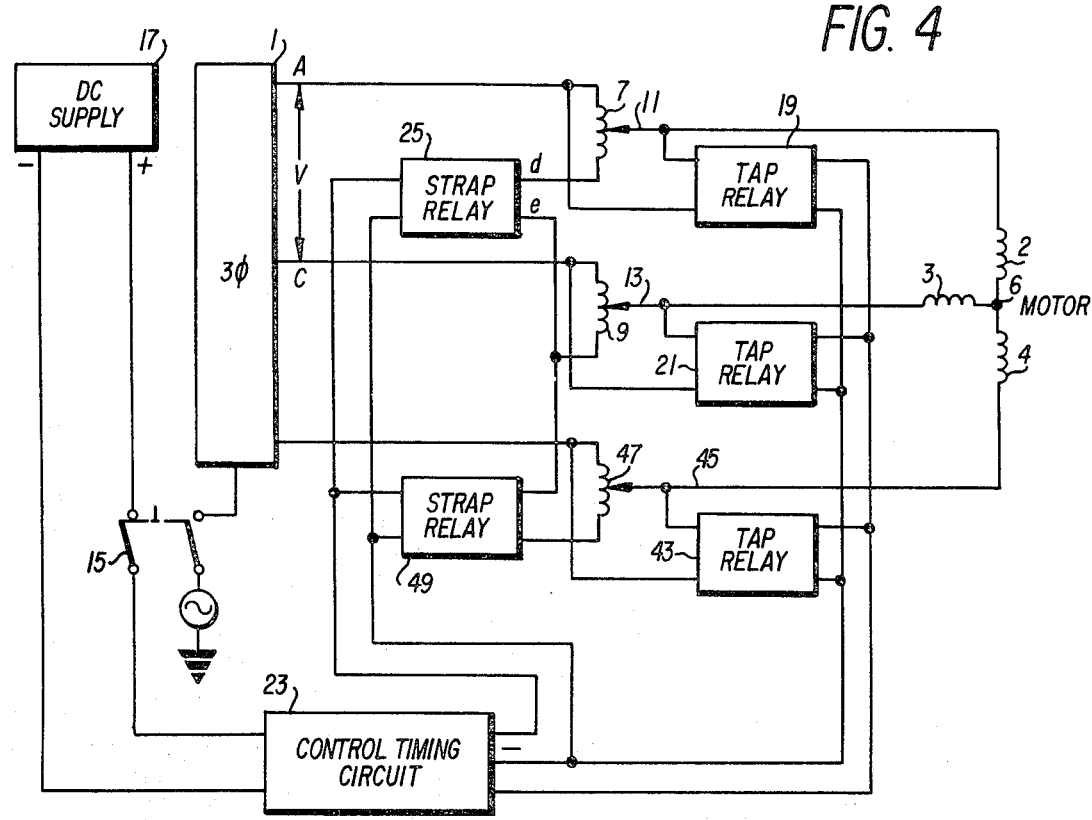
FIG. 4 shows a circuit diagram of an alternate embodiment utilizing a 3-coil autotransformer.

FIG. 4 illustrates an alternate embodiment of the invention wherein a 3-coil autotransformer is used to apply reduced operational voltages to the windings 2, 3 and 4 of the motor 6. In the circuit of FIG. 4, an additional tap relay 43 is used to shunt a tap 45 of the coil 47 to the third wire of the 3-wire line in order to apply a line voltage to the third winding 4 of the motor 6 to start the motor.

An additional strap relay 49 is used to control the strap connection between the coils 9 and 47 in the manner described for the coils 7 and 9 of the circuit of FIG. 1. It should be appreciated that the timing for switching the relays of FIG. 4 is the same as the relay timing for the circuit of FIG. 1. It should also be understood that a mechanical stop could be employed for the tap of the autotransformer coil 47 in the manner described for the coils 7 and 9 of FIG. 3. Also, the strap relays and tap relays of FIG. 4 may operate as either normally open or normally closed relays in the manner described for the circuit of FIG. 1.

The invention may be embodied in other specific forms without departing from its spirit or essential characteristics. The present embodiments are, therefore, to be considered in all respects as illustrative and not restrictve, the scope of the invention being indicated by the claims rather than by the foregoing description, and all changes which come within the meaning and range of equivalents of the claims are therefore intended to be embraced therein.

What is claimed is:

1. Motor operating apparatus for starting an electric motor having a plurality of interconnected primary windings at full line voltage and for operating said motor at running speed at a reduced line voltage, comprising:
   autotransformer means having at least two coils and a strap means for connecting the at least two coils in series;
   source means for applying a particular line voltage to input ends of the coils of said autotransformer means;
   tap means for adjustably contacting each of said coils to receive a corresponding voltage which is reduced as compared with said line voltage and connected to apply the reduced voltage of each coil to at least one associated primary winding of the motor; and
   tap switching means for shorting out the part of each of said coils between said source means and said tap means to connect said tap means to receive said full line input voltage to start the motor and for disconnecting said tap means from said line input voltage after starting to allow said tap means to supply said associated primary windings with the reduced voltages to operate said motor at running speed.

2. The motor start apparatus of claim 1 wherein said strap means includes a strap switching means for disconnecting said at least two coils from each other before said tap switching means has operated to connect said tap means to said line input voltage and for connecting said at least two coils after said tap switching means has operated to disconnect said tap means from said line input voltage.

3. The motor start apparatus of claim 2 wherein said strap switching means includes a solid state switch.

4. The motor start apparatus of claim 3 including timing control means for operating said strap switching solid state switch to disconnect said at least two coils when said motor is off and for operating the strap switching solid state switch to connect said at least two coils at a particular time delay after said tap switching means has operated to disconnect said tap means from said line voltage.

5. The motor start apparatus of claim 1 wherein said tap means includes:
- a first wiper connection means for adjustably connecting a first coil of said autotransformer means and an end of an associated first primary winding of said motor, and
- a second wiper connection means for adjustably connecting a second coil of said autotransformer means and an end of an associated second primary winding of said motor.

6. The motor start apparatus of claim 5 wherein said tap switching means includes
- a first solid state tap switch connected between said first wiper connection means and an input end of said first coil of the autotransformer, and
- a second solid state tap switch connected between said second wiper connection means and an input end of said second coil of the autotransformer.

7. The motor start apparatus of claim 6 including timing control means for applying said line input voltage and operating said first and second solid state tap switches to shunt said first and second wiper connection means to associated input ends of said first and second coils in response to a motor start signal, said first and second solid state tap switches being operated to make the shunt connections before the line input voltage has charged said first and second coils of the autotransformer.

8. The motor start apparatus of claim 7 wherein said timing control means includes means for operating said first and second solid state tap switches to disconnect the associated first and second wiper connection means from said line input voltage after a particular time delay.

9. The motor start apparatus of claim 8 wherein said strap means includes a solid state strap switch and said timing control means includes means for operating said solid state strap switch to disconnect said first and second coils when said motor is off and when said motor is being started, said timing control means having means for operating said solid state strap switch to connect said first and second coils at a particular time delay after said first and second solid state tap switches are operated to disconnect the associated first and second wiper connection means from the line input voltage.

10. The motor start apparatus of claim 5 wherein said tap means includes a third wiper connection means for adjustably connecting a third coil of said autotransformer means and an end of an associated third primary winding of said motor, and
- said tap switching means includes a third solid state tap switch connected between said third wiper connection means and an input end of said third coil of the autotransformer.

11. The motor start apparatus of claim 10 including timing control means for applying said line input voltage and operating said first, second and third solid state tap switches to shunt said first, second and third wiper connection means to associated input ends of said first, second and third coils in response to a motor start signal, said first, second and third solid state tap switches being operated to make the shunt connections before the line input voltage has charged said first, second and third coils of the autotransformer.

12. The motor start apparatus of claim 11 wherein said timing control means includes means for operating said first, second and third solid state tap switches to disconnect the associated first, second and third wiper connection means from said line input voltage after a particular time delay.

13. The motor start apparatus of claim 12 wherein said strap means includes a first solid state strap switch for connecting said first and second coils in series and a second solid state strap switch for connecting said second and third coils in series, and said timing control means includes means for operating said first and second solid state strap switches to disconnect said first and second coils and said second and third coils when said motor is off and when said motor is being started, said timing control means having means for operating said first and second solid state strap switches to connect said first and second and said second and third coils at a particular time delay after said first, second and third solid state tap switches are operated to disconnect the associated first, second and third wiper connection means from the line input voltage.

* * * * *